United States Patent [19]

Weaver

[11] 4,425,941

[45] * Jan. 17, 1984

[54] VALVE CONSTRUCTION HAVING MULTIPLE PISTON MEANS AND METHOD OF MAKING THE SAME

[75] Inventor: Marvin P. Weaver, Knoxville, Tenn.

[73] Assignee: Robertshaw Controls Company, Richmond, Va.

[*] Notice: The portion of the term of this patent subsequent to Oct. 21, 1997 has been disclaimed.

[21] Appl. No.: 273,220

[22] Filed: Jun. 12, 1981

Related U.S. Application Data

[60] Division of Ser. No. 126,836, Mar. 3, 1980, abandoned, which is a continuation-in-part of Ser. No. 911,403, Jun. 1, 1978, Pat. No. 4,228,817.

[51] Int. Cl.³ .............................................. F16K 11/04
[52] U.S. Cl. ..................................... 137/871; 137/79; 137/878
[58] Field of Search ................... 137/513.3, 599.2, 79, 137/607, 636, 595, 871, 878, 877; 251/324, 121

[56] References Cited

U.S. PATENT DOCUMENTS

| | | | |
|---|---|---|---|
| 2,853,159 | 9/1958 | Kuhn, Jr. | 137/513.3 |
| 3,633,605 | 1/1972 | Smith | 137/512.5 |
| 3,913,322 | 10/1975 | Over et al. | 137/513.3 |
| 3,960,124 | 6/1976 | Payne | 123/117 A |
| 3,972,472 | 8/1976 | Kawabata | 236/101 A |
| 4,133,349 | 1/1979 | Striplirs | 251/324 |
| 4,147,180 | 4/1979 | Steele, Jr. | 137/599.2 |
| 4,228,817 | 10/1980 | Weaver | 137/79 |

*Primary Examiner*—A. Michael Chambers
*Attorney, Agent, or Firm*—Candor, Candor & Tassone

[57] ABSTRACT

A valve construction having a housing provided with a chamber and ports leading to the chamber and having an axially movable piston unit disposed in the chamber to interconnect certain of the ports together in relation to the axial position of the piston unit that is caused by a condition responsive device and a spring operatively associated with the piston unit, the piston unit comprising a plurality of pistons disposed in spaced substantially parallel relation and being secured together to be axially moved in unison in the chamber under the influence of the condition responsive device. The spring comprises a single coiled compression spring telescopically receiving the pistons therein, the pistons being of different lengths.

5 Claims, 18 Drawing Figures

VALVE CONSTRUCTION HAVING MULTIPLE PISTON MEANS AND METHOD OF MAKING THE SAME

CROSS REFERENCE TO RELATED APPLICATION

This application is a divisional patent application of its copending parent patent application, Ser. No. 126,836 filed Mar. 3, 1980, now abandoned, which is a continuation in part of Ser. No. 911,403, filed June 1, 1978, now U.S. Pat. No. 4,228,817, issued Oct. 21, 1980.

BACKGROUND OF THE INVENTION

1. Field of the Invention

This invention relates to an improved condition responsive valve construction and method of making the same.

2. Prior Art Statement

It is known to provide a valve construction having a housing means provided with a chamber and port means leading to the chamber and having an axially movable piston means disposed in the chamber to interconnect certain of the port means together in relation to the axial position of the piston means that is caused by a condition responsive device operatively associated with the piston means.

For example, see the following four U.S. patents:

(1) U.S. Pat. No. 3,989,059—Jackson et al
(2) U.S. Pat. No. 3,960,125—Pavne
(3) U.S. Pat. No. 3,972,472—Kawabata
(4) U.S. Pat. No. 3,364,942—Nev et al It appears that the valve construction of item (1) above has an axially movable piston member which through the length thereof can control various sets of ports in the housing means carrying the piston member, the piston member being operated by a piston and cylinder temperature responsive device operatively interconnected to one end of the piston member.

Similarly, the valve construction of item (2) above has a piston member for controlling port means of a housing means, the piston member of item (2) above carrying axially spaced flexible O-rings in annular grooves thereof to provide the sealing functions between certain ports thereof whereas the housing means of item (1) above has such O-rings being carried thereby to operate on various lands of the piston member.

It appears that the valve construction of item (3) above has a single disc-like piston member acting against a plurality of non-attached piston-like valve stems carried respectively by a plurality of piston-like valve members that control separate sets of port means of a housing means in response to sensed temperature of a temperature responsive device interconnected to the disc-like piston member.

It appears that the valve construction of item (4) above has a pair of piston-like valve members disposed for parallel axial movement in a housing, the piston valve members having adjacent ends thereof interconnected together outboard of the housing means receiving the same.

It is also known to provide a self-contained temperature responsive valve construction having a housing provided with a pair of ports separated by a valve seat that is opened and closed by a valve member in response to the temperature sensed by a piston and cylinder type temperature responsive device carried by the housing and being operatively associated with the valve member to control the same through axial movement thereof, a by-pass passage being adapted to interconnect the pair of ports together independently of the valve seat and having a one-way check valve therein to permit fluid flow between the ports through the by-pass passage in only one direction. In addition, such prior known self-contained temperature responsive valve construction has restriction means always interconnecting the two ports together independently of the valve seat and one-way check valve.

For example, see the following U.S. patent:

(5) U.S. Pat. No. 4,147,180—Steele, Jr.

It appears that the by-pass passage of the valve construction of item (5) above is in the piston valve member and the one-way check valve means comprises a ball member at the free end of the piston valve member.

It is also known to applicant that others have used an umbrella-type flexible one-way valve member in place of the ball valve member of the valve construction of item (5) above, the umbrella-type one-way valve member having a porous restrictor in the center thereof to provide a controlled bleed through the by-pass passage whereby such umbrella-type one-way valve member and its restrictor means is substantially identical to the one-way device illustrated in FIGS. 9-18 of the drawings of this application.

SUMMARY OF THE INVENTION

It is a feature of this invention to provide a valve construction with a unique piston arrangement so that multiple port control can be provided thereby while maintaining the overall length of the valve construction relatively short.

In particular, one embodiment of this invention provides a valve construction having a housing means provided with a chamber and port means leading to the chamber and having an axially movable piston means disposed in the chamber to interconnect certain of the port means together in relation to the axial position of the piston means that is caused by a condition responsive device and a spring means operatively associated with the piston means, the piston means comprising a plurality of pistons disposed in spaced substantially parallel relation and being secured together to be axially moved in unison in the chamber under the influence of the condition responsive means. The spring means comprises a single coiled compression spring that telescopically receives the pistons therein.

Each piston of the piston means of this invention is adapted to control the interconnection of certain of the port means independently of the remainder of the pistons.

In one embodiment of this invention, each of the pistons is adapted to change the interconnection of its respective port means at the same sensed condition of the condition responsive device that causes the remainder of the pistons to change its respective port interconnection.

In another embodiment of this invention, each piston is adapted to change the interconnection of its respective port means at a sensed condition of the condition responsive device different than the sensed condition thereof that causes the remainder of the pistons to change its respective port interconnection.

In another embodiment of this invention, the pistons are of different lengths.

Another embodiment of this invention provides a valve construction having a housing means provided with a chamber and first, second and third port means leading to the chamber and having an axially movable piston means disposed in the chamber to interconnect certain of the port means together in relation to the axial position of the piston means caused by a condition responsive device operatively associated with the piston means, the piston means comprising first and second pistons disposed in spaced substantially parallel relation and being secured together to be axially moved in unison in the chamber under the influence of the condition responsive device. The chamber has first and second sections respectively receiving part of the first and second pistons therein, the first and second sections respectively having the first and second port means interconnecting therewith whereby each piston part controls the port means of its respective section independently of the other piston. The chamber has a third section thereof that is disposed in communication with the first and second sections and receives the remaining parts of the pistons therein, the third port means interconnecting with the third section of the chamber in all positions of the pistons in the chamber.

Another embodiment of this invention provides a self-contained temperature responsive valve construction having a housing means provided with a pair of ports separated by a valve seat means that is opened and closed by a valve member means in response to temperature sensed by a piston and cylinder type temperature responsive device carried by the housing means and being operatively associated with the valve member means to control the same through axial movement thereof, the housing means having a by-pass passage means therein adapted to interconnect the pair of ports together independently of the valve seat means. A one-way check valve means is carried by the housing means and controls the by-pass passage means in a manner to permit fluid between the ports through the by-pass passage means in only one direction, one of the ports being disposed intermediate the valve seat means and the one-way check valve means.

Accordingly, it is an object of this invention to provide an improved valve construction having one or more of the novel features of this invention as set forth above or hereinafter shown or described.

Another object of this invention is to provide a method of making such a valve construction or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
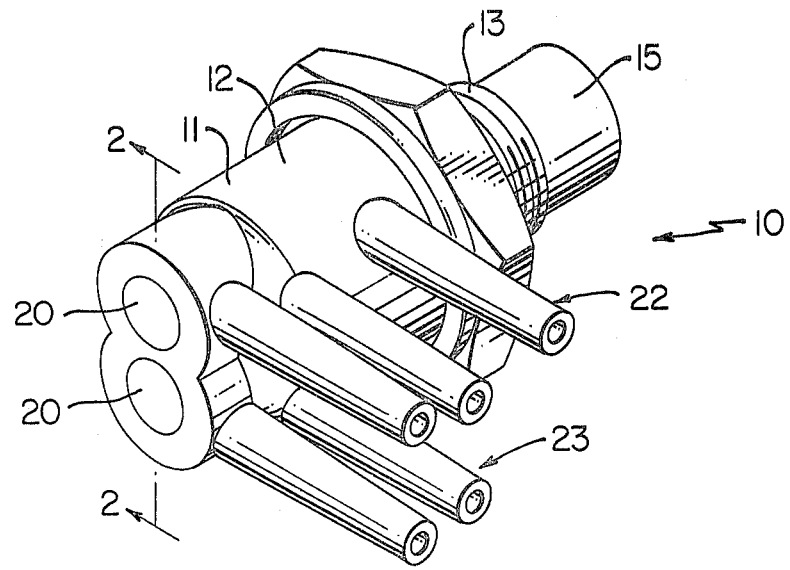
FIG. 1 is a perspective view of one embodiment of the valve construction of this invention.

While the various features of this invention are hereinafter described and illustrated as being particularly adapted to provide temperature operated valve constructions, it is to be understood that the various features of this invention can be utilized singly or in any combination thereof to provide a valve construction that can be responsive to other conditions as desired.

Therefore, this invention is not to be limited to only the embodiments illustrated in the drawings, because the drawings are merely utilized to illustrate one of the wide variety of uses of this invention.

Figure 2:
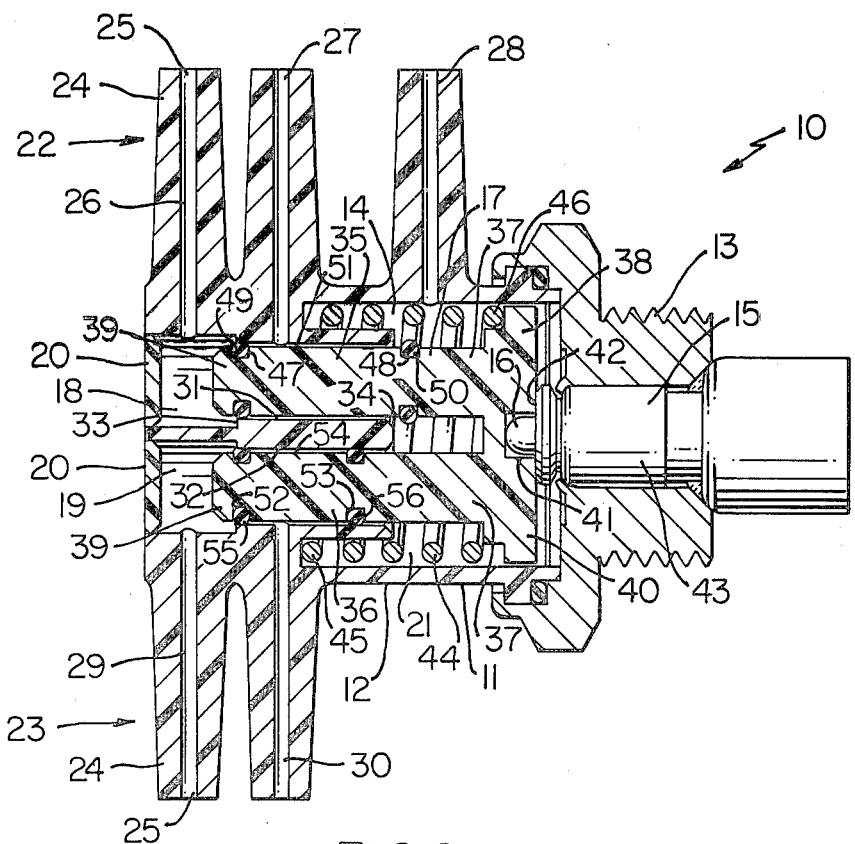
FIG. 2 is an enlarged cross-sectional view taken on line 2—2 of FIG. 1 and illustrates the two rows of ports being disposed 180° apart rather than parallel as illustrated in FIG. 1.

Referring now to FIGS. 1 and 2, an improved valve construction of this invention is generally indicated by the reference numeral 10 and comprises a housing means 11 formed from two parts 12 and 13 suitably secured together to define a chamber 14 within the housing member 12 and carrying a conventional piston and cylinder temperature responsive device 15 by the housing member 13 whereby a piston member 16 of the temperature responsive device 15 is adapted to project into the chamber 14 and control the position of a piston means 17 disposed for axial movement therein in a manner hereinafter set forth.

The chamber 14 of the housing means 11 has two cylindrical sections 18 and 19 disposed spaced and parallel to each other and respectively having their left hand ends in FIG. 2 closed by suitable plugs 20 while the right hand ends thereof in FIG. 2 are adapted to be respectively disposed in fluid communication with a main part or section 21 of the chamber 14 as illustrated.

The housing member 12 has two rows or sets 22 and 23 of outwardly directed nipple means 24 each of which has a port means 25 passing therethrough and intersecting with the chamber 14.

In particular, the row or set 22 of port means 25 comprises three ports 26, 27 and 28 with the ports 26 and 27 respectively intersecting with the section 18 of the chamber 14 while the port 28 intersects with the main part 21 thereof.

The row or set 23 of port means 25 has two ports 29 and 30 respectively intersecting with the section 19 of the chamber 14.

The housing member 12 has an inwardly stepped cylindrical valve seat section 31 in the chamber section 18 and has a similar inwardly stepped valve seat section 32 in the chamber section 19, the valve seat lengths or sections 31 and 32 respectively having opposed ends or shoulders 33 and 34 for a purpose hereinafter described.

The ports 27 and 30 respectively interrupt the valve seat sections 31 and 32 intermediate their ends 33 and 34 thereof for a purpose hereinafter described.

The piston means 17 of this invention comprises a one-piece structure formed of any suitable material having two cylindrical pistons 35 and 36 disposed in speced parallel relation and respectively integrally interconnected together at their ends 37 to a plate-like part 38 while their other ends 39 are disposed in free cantilevered form remote from the plate means 38, the piston members 35 and 36 being adapted to be respectively received in the sections 18 and 19 of the chamber 14 as illustrated while the plate means 38 is disposed in the main part 21 of the chamber 14.

The plate means 38 is interrupted at the side 40 thereof by an opening 41 that is adapted to receive the piston 16 of the temperature responsive device 15 therein while an end surface 42 of a cylinder part 43 of the device 15 is adapted to abut against the surface 40 of the plate means 38 of the piston means 17 when the piston means 17 has caused substantially a full retraction of the piston member 16 within the housing held cylinder 43 of the device 15 under the force of a compression spring 44 that is disposed in the main part 21 of the chamber 14 and has one end 45 bearing against the housing member 12 and the other end 46 thereof bearing against the plate means 38 to tend to move the piston means 17 to the right in FIG. 2.

The piston 35 has a pair of spaced annular grooves 47 and 48 formed therein and respectively receiving annular resilient O-ring-like members 49 and 50 which project outwardly beyond the outer peripheral cylindrical surface 51 of the piston 35 in such a manner that when the O-ring member 49 or 50 is received in the valve seat section 31 of the chamber section 18, the particular O-ring member 49 or 50 will seal against the same completely around the piston 35 for a valving purpose hereinafter described.

Similarly, the piston 36 has a pair of axially spaced annular grooves 52 and 53 formed in the outer peripheral cylindrical surface 54 thereof and respectively receiving annular resilient O-ring-like members 55 and 56 which are respectively adapted to seal completely around the piston 36 against the valve seat section 32 of the chamber section 19 when disposed therein for a valving purpose hereinafter described.

The temperature responsive device 15 is conventional in the art and the same contains a wax charge or the like which expands upon the sensing of a certain temperature to force the piston 16 outwardly relative to the housing held cylinder member 43 and when cooled below that certain temperature, the wax charge contracts to permit the piston 16 to be retracted into the cylinder member 43, such as by the force of the compression spring 44, whereby the temperature sensed by the device 15 determines the position of the piston means 17 relative to the housing means 11 and, thus, determines the interconnection of the port means 25 by the pistons 35 and 36 in a manner now to be described.

In the embodiment of the valve construction 10 of this invention illustrated in FIG. 2, the sealing members 49, 50 and 55, 56 are so arranged on their respective pistons 35 and 36 that when the device 15 is sensing a temperature which permits the piston 16 to be fully retracted into the cylinder 43 as illustrated in FIG. 2, the sealing member 49 of the piston 35 is sealing against the valve seat section 31 intermediate the ports 26 and 27 while the sealing member 50 is spaced from the end 34 of the valve seat section 31 so that port 28 is disposed in fluid communication with the port 27.

Under such conditions of the temperature responsive device 15, the sealing members 55 and 56 of the piston 36 are disposed in sealing engagement against the valve seat section 32 with the sealing member 55 being disposed intermediate the ports 29 and 30 so that the ports 29 and 30 are sealed from each other end the port 30 is sealed from the port 28 because the sealing member 56 is disposed intermediate the port 30 and the end 34 of the valve seat section 32.

However, when the temperature sensed by the device 15 increases to a particular temperature thereof so that the wax charge therein expands to force the piston 16 to the left in FIG. 2 out of the held cylinder 43 to move the piston means 17 axially to the left in FIG. 2 in opposition to the force of the compression spring 44, the sealing member 49 is moved to the left beyond the end 33 of the valve seat section 31 to disconnect the ports 27 and 28 from each other. At the same time, the sealing member 55 of the piston 36 is moved to the left beyond the end 33 of the valve seat section 32 to now fluidly interconnect the ports 29 and 30 together, the sealing member 56 still remaining in sealing contact with the valve seat section 32 intermediate the ports 30 and 28 so that the port 29 is never fluidly interconnected to the port 30.

In this manner, it can be seen that the chamber section 19 of the valve construction 10 is being utilized as a two port, normally closed valve while the chamber section 18 of the valve construction 10 is being utilized as a three port switching valve with the center port 27 and the end port 26 being common when the device 15 is cold and switching to have the ports 26 and 27 common when the device 15 is hot.

When the device 15 subsequently cools to permit the piston 16 to retract into the cylinder 43 in the manner illustrated in FIG. 2 under the force of the compression spring 44, the piston 35 disconnects the port 26 from the port 27 while interconnecting the port 27 to the port 28 and the piston 36 disconnects the ports 29 and 30 from each other.

Therefore, it can be seen that the valve construction 10 as illustrated in FIGS. 1 and 2 is adapted to provide two different switching functions wherein the operation of the chamber sections 18 and 19 are independent from each other so that the overall length of the valve construction 10 is relatively short when compared with devices that attempt to accomplish the same switching functions by a single piston member.

While the valve construction 10 has been previously described as having the switching function for the row 22 of ports 25 occurring at the same sensed temperature that the switching function for the row 23 of ports 25 is taking place, it is to be understood that the switching for the row 22 of ports 25 could take place at a different sensed temperature than the switching for the row 23 of ports 25 by merely forming one or more of the annular grooves 47, 48, 52 and 53 for the pistons 35 and 36 in different axial positions.

Figure 3:
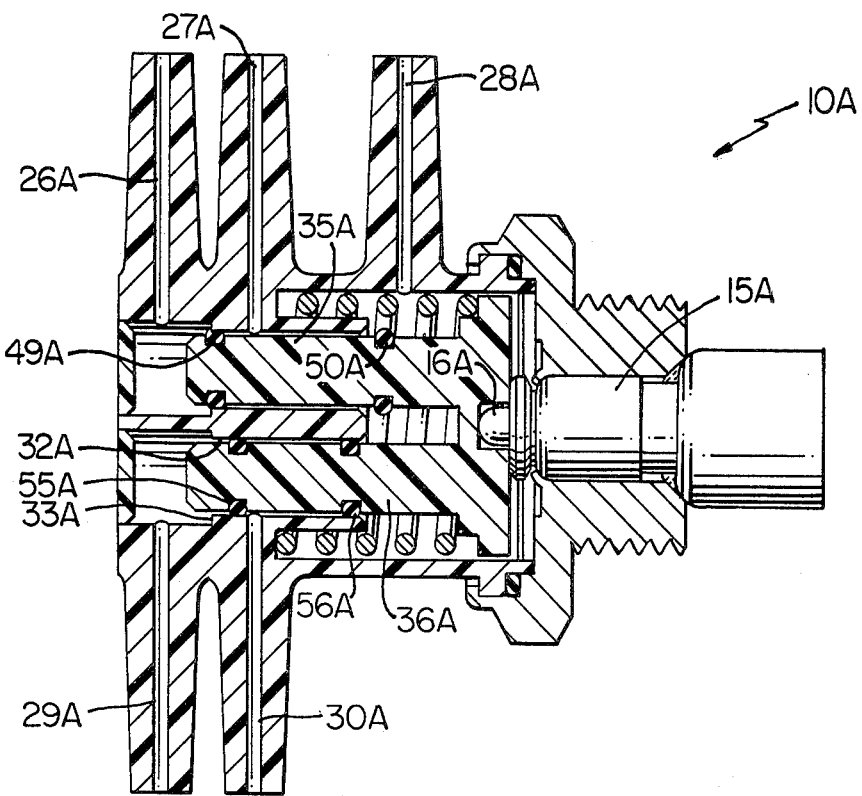
FIG. 3 is a view similar to FIG. 2 and illustrates another embodiment of the valve construction of this invention.

For example, reference is now made to FIG. 3 wherein another embodiment of the valve construction of this invention is generally indicated by the reference numeral 10A and parts thereof that are similar to the valve construction 10 previously described are indicated by like reference numerals followed by the reference letter "A".

As illustrated in FIG. 3, the sealing members 49A and 50A of the piston 35A are in the same location as the piston 35 previously described while the sealing members 55A and 56A for the piston 36A are located further to the right than the sealing members 55 and 56 of the piston member 36.

In this manner, the piston 35A will cause its switching function for the ports 26A, 27A and 28A at the same temperature that the piston 35 performed its switching function as previously described, but at that time the sealing member 55A of the piston 36A is still disposed in sealing engagement against the valve seat section 32A so that the ports 29A and 30A are still disconnected from each other. However, upon a further increase in the temperature sensed by the device 15A, the piston means 17A is further moved to the left in FIG. 3 by the extending piston 16A so that at a certain higher sensed temperature, the sealing member 55A is moved to the left beyond the end 33A of the valve seat section 32A to interconnect the ports 29A and 30A together while the sealing member 56A still remains in sealing contact with the valve seat surface 32A intermediate the ports 30A and 28A.

Thus, it can be seen that the valve construction 10A performs the switching function for the piston 35A at a lower temperature than the temperature that causes a switching function for the piston 36A.

Obviously, the pistons 35A and 36A could have the sealing members 49A, 50A and 55A, 56A arranged in such a manner that the piston 36A will perform its switching function at a lower temperature than the temperature that will cause the piston 35A to perform its switching function.

Also, it is to be understood that the valve construction 10 of this invention could be utilized to have both cavities or chamber sections 18 and 19 thereof utilized as three port switching valves so that the port 28 would be common to both sections 18 and 19 when the temperature sensing device 15 is cold or sensing a temperature below the switching temperature thereof, the two chamber sections 18 and 19 switching at the same temperature or at different temperatures as desired.

Figure 4:
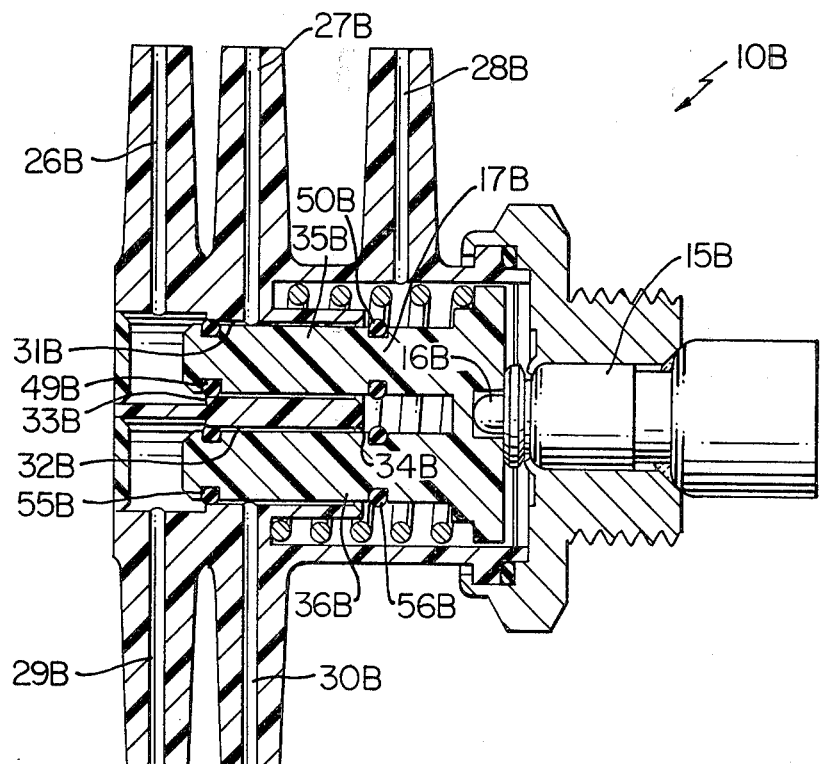
FIG. 4 is a view similar to FIG. 2 and illustrates another embodiment of the valve construction of this invention.

In particular, reference is now made to FIG. 4 wherein another valve construction of this invention is generally indicated by the reference numeral 10B and parts thereof similar to the valve construction 10 previously described are indicated by like reference numerals followed by the reference letter "B".

As illustrated in FIG. 4, the valve construction 10B is substantially identical to the valve construction 10 previously described as the only difference between the valve construction 10 and 10B is that the sealing member 56B for the piston 36B has been moved to the right to such a position that when the device 15B is sensing a temperature below the actuating temperature thereof, the sealing member 56B is to the right beyond the end 34B of the valve seat section 32B so that the port 28B is disposed in fluid communication with the port 30B as well as in fluid communication with the port 27B.

However, when the device 15B senses a certain temperature to extend the piston 16B to the left in FIG. 4 and move the piston means 17B to the left so that the sealing members 50B and 56B respectively seal against the valve seat sections 31B and 32B to disconnect the port 28B from the ports 27B and 30B, the sealing members 49B and 55B have been moved to the left beyond the ends 33B of the valve seat sections 31B and 32B to permit the ports 27B and 30B to be respectively interconnected to the ports 26B and 29B as previously described.

While the pistons 35B and 36B of FIG. 4 have been illustrated and described as switching at the same temperature, it is to be understood that the same could switch at different temperatures with the piston 35B switching at a lower temperature than the piston 36B or with the piston 36B switching at a temperature lower than the piston 35B by merely having the sealing members of the respective pistons 35B and 36B rearranged thereon as previously described.

Figure 5:
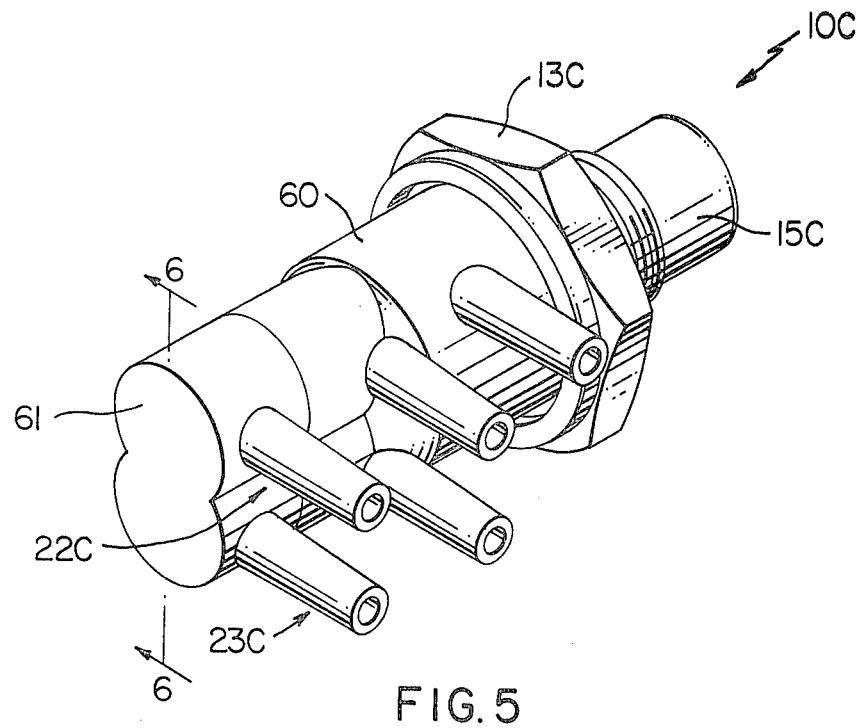
FIG. 5 is a perspective view illustrating another embodiment of the valve construction of this invention.
Figure 6:
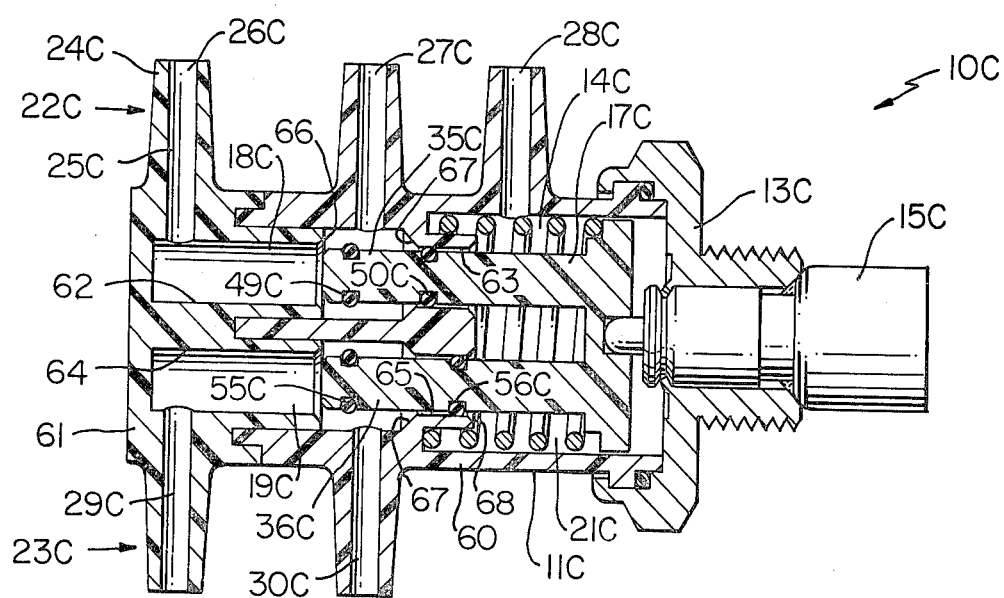
FIG. 6 is an enlarged cross-sectional view taken on line 6—6 of FIG. 5 with the two rows of ports thereof being shown approximately 180° apart rather than parallel as in FIG. 5.

Another valve construction of this invention is generally indicated by the reference numeral 10C in FIGS. 5 and 6 and parts thereof that are similar to the valve construction 10 previously described are indicated by like reference numerals followed by the reference letter "C".

While the valve construction 10C has a housing means 11C, a temperature sensing device 15C, an axially movable piston means 17C formed of two piston members 35C and 36C respectively movable in chamber sections 18C and 19C similar to the valve construction 10 previously described, the housing means 11C is formed from the housing part 13C and two other housing members 60 and 61 suitably secured together and cooperating together to define the chamber 14C as well as the two rows or sets 22C and 23C of nipple means 24C and port means 25C previously described.

However, the housing members 60 and 61 respectively define inwardly directed annular elongated and axially spaced valve seat surfaces or sections 62 and 63 in the chamber section 18C and similar inwardly directed annular valve seat surfaces or sections 64 and 65 in the chamber section 19C, the ends 66 of the valve seat sections 62 and 64 being respectively axially spaced from adjacent ends 67 of the valve seat surfaces 63 and 65 which have other ends 68 terminating in the main part 21C of the chamber 14C.

The ports 26C and 29C respectively intersect the valve seat sections 62 and 64 and the ports 27C and 30C respectively intersect the chamber sections 18C and 19C intermediate the valve seat sections 62, 63 and 64, 65 while the port 28C intersects the main part 21C of the chamber 14C.

The annular sealing members 49C and 50C for the piston 35C are so arrangd that when the device 15C is in its fully collapsed temperature sensing condition as illustrated in FIG. 6, the sealing member 49C is spaced to the right from the end 66 of the valve seat surface 62 so that the ports 26C and 27C are fluidly interconnected together while the sealing member 50C seals against the valve seat surface 63 to prevent fluid communication between the ports 27C and 28C.

Similarly, the sealing members 55C and 56C of the piston member 36C are so positioned when the device 15C is in the cold condition illustrated in FIG. 6 that the sealing member 55C is spaced to the right from the end 66 of the valve seat 64 so that the ports 29C and 30C are fluidly interconnected together and the sealing member 56C prevents fluid communication between the port 30C and the port 28C.

However, when the temperature sensing device 15C senses a certain temperature to cause the piston 15C to move to the left in FIG. 6 a certain distance to move the piston means 17C so that the sealing members 49C and 55C respectively seal against the valve seat surfaces 62 and 64, fluid communication between the ports 26C and 27C is terminated as well as between the ports 29C and 30C. At this time, the sealing member 50C has been moved to the left beyond the end 67 of the valve seat surface 63 so that the port 28C is now interconnected to the port 27C. However, at this time, the sealing member 56C is still in sealing engagement with the valve seat surface 65 so that port 30D is still blocked from the port 28D.

As previously stated, by merely rearranging one or more of the sealing members 49C, 50C, 55C and 56C on their respective piston means 35C and 36C, the upper row 26C of ports 25C can be switched at a different temperature from the switching temperature for the lower row 23C of port 25C.

Figure 7:
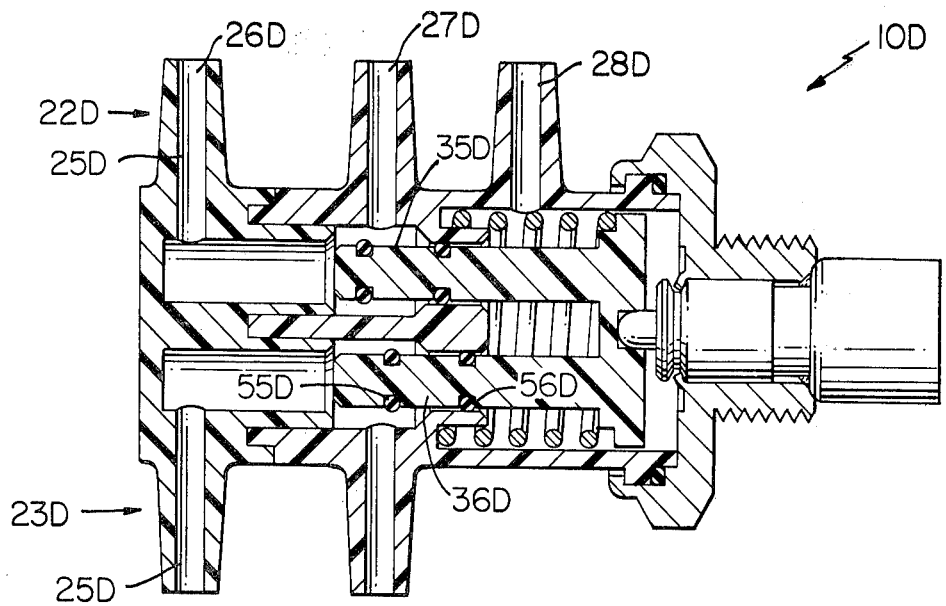
FIG. 7 is a view similar to FIG. 6 and illustrates another embodiment of the valve construction of this invention.

For example, the valve construction 10D in FIG. 7 is substantially identical to the valve construction 10C previously described whereby like parts are indicated by like reference numerals followed by the reference letter "D".

However, the sealing members 55D and 56D have been moved further to the right on the piston 36D so that the piston member 36D switches at a higher temperature than the piston 35D.

Accordingly, it can be seen that in the valve constructions 10C and 10D of FIGS. 6 and 7, the row or set 23C or 23D of ports 25C or 25D can be utilized as a two port normally opened valve while the row 22C or 22D is used as a three port switching valve with the ports 26C or 26D and 27D or 27C being common when the valve is cold and switching to have the port 28C or 28D common to the port 27C or 27D when the valve is hot.

As shown by the valve construction 10D, the rows 22D and 23D of ports 25D can be switched at the same temperature or different temperatures as desired.

Also, the valve construction 10C can be used as two three port switching valves having the port 28C common to both sides or chamber sections 18C and 19C when the valve is hot and they can be switched at the same temperature or different temperatures as desired.

Figure 8:
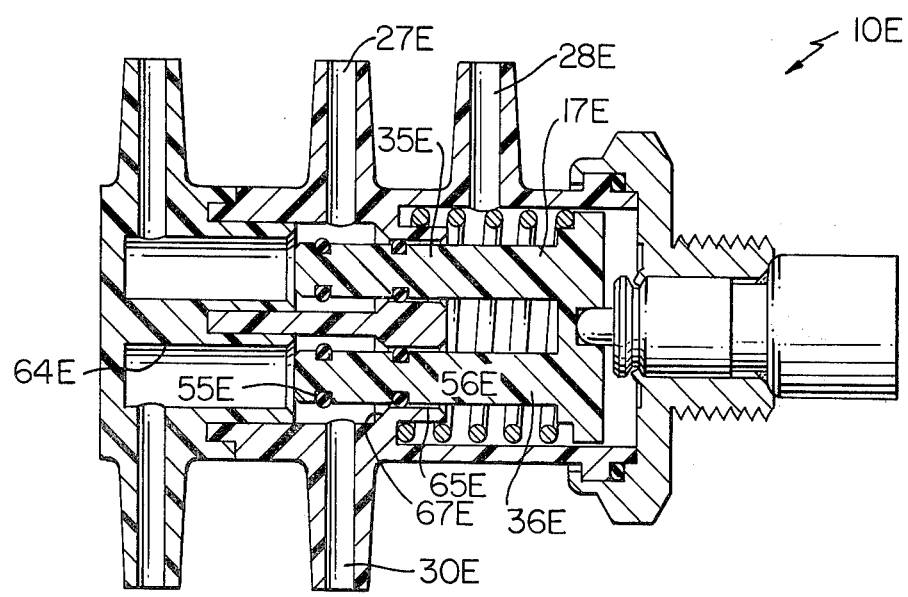
FIG. 8 is a view similar to FIG. 6 and illustrates another embodiment of the valve construction of this invention.

For example, reference is now made to FIG. 8 wherein another valve construction of this invention is generally indicated by the reference numeral 10E and parts thereof similar to the valve construction 10C previously described are indicated by like reference numerals followed by the reference letter "E".

As illustrated in FIG. 8, the sealing member 56E is spaced further to the left than the valve member 56C of FIG. 6 so that when the piston 36E is moved to the left in FIG. 8 to close the sealing member 55E against the valve seat surfaces 64E, the sealinag member 56E is spaced to the left beyond the end 67E of the valve seat surface 65E so that the port 28E is now common to the port 30E as well as to the port 27E because the piston member 35E has also accomplished its switching function at this time.

Of course, the piston means 17E can be changed so that the same will switch the piston members 35E and 36E at different sensed temperatures in the manner previously described.

Another valve construction of this invention is generally indicated by the reference numeral 10F in FIGS. 9–13 and parts thereof similar to the other valve constructions of this invention are indicated by like numerals followed by the reference letter "F".

Figure 9:
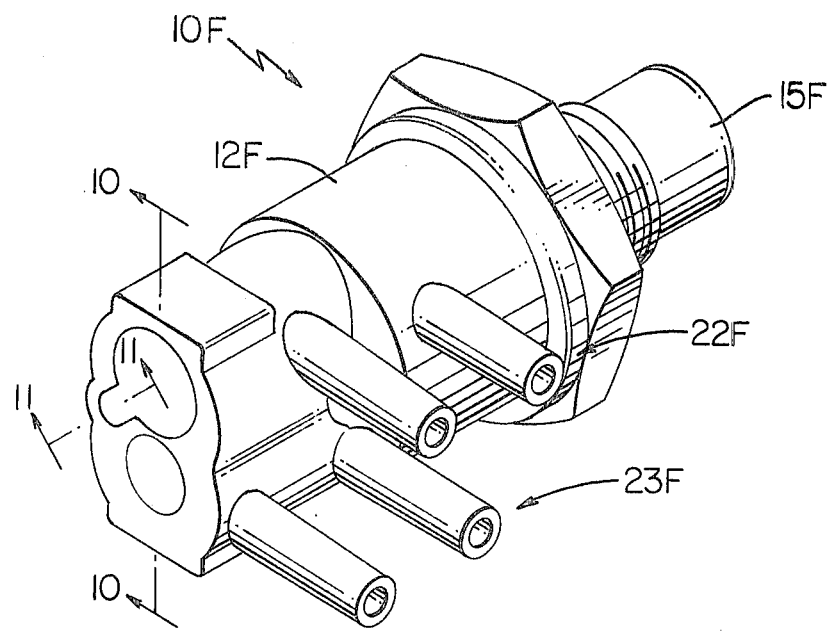
FIG. 9 is a perspective view illustrating another embodiment of the valve construction of this invention.
Figure 10:
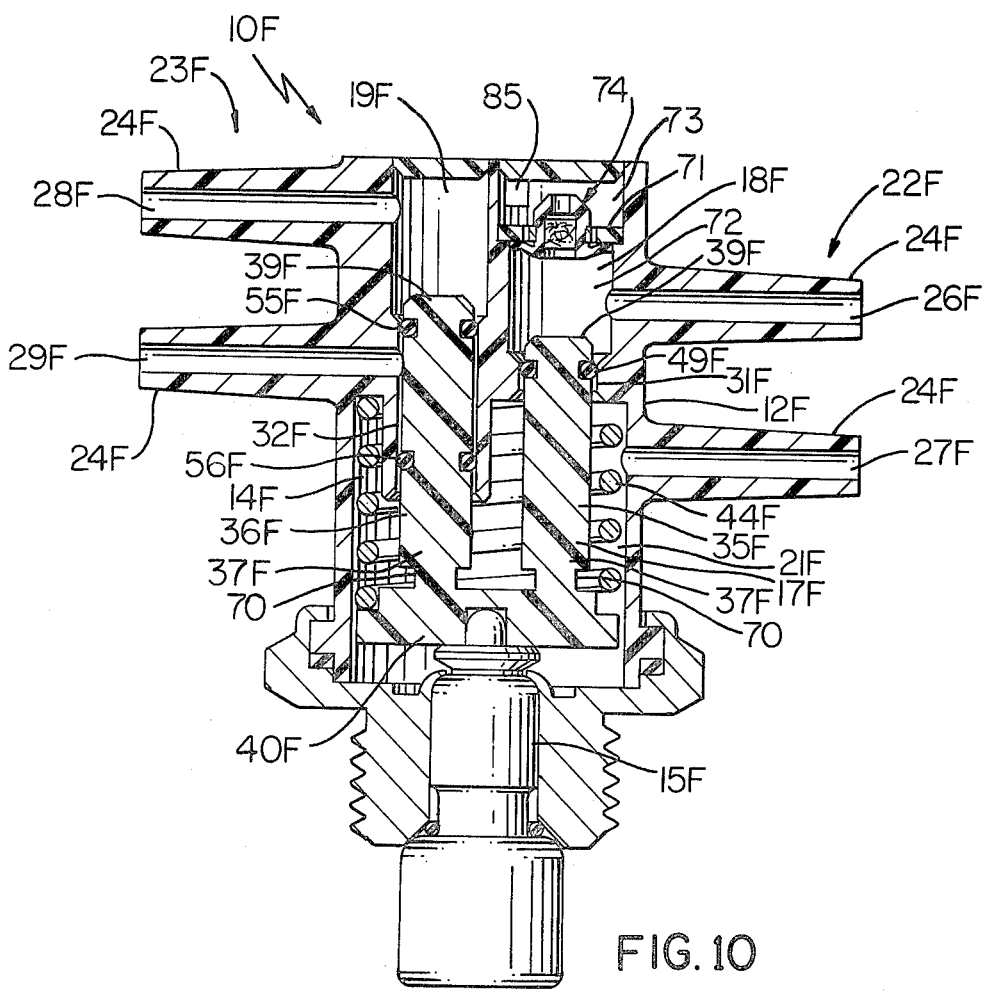
FIG. 10 is an enlarged cross-sectional view taken on line 10—10 of FIG. 9 with the two rows of ports thereof being shown approximately 180° apart rather than parallel to each other as in FIG. 9.

As illustrated in FIGS. 9 and 10 the valve construction 10F includes two parallel rows or sets 22F and 23F of nipple means 24F respectively having ports 26F, 27F and 28F, 29F interrupting the same and respectively leading to the chamber sections 18F and 19F that respectively receive the pistons 35F and 36F of the piston means 17F therein to respectively control the valve seat means 31F and 32F of the housing means 12F in the manner previously described.

However, the pistons 35F and 36F of the piston means 17F of the valve construction 10F has the adjacent ends 37F thereof that join with the plate means 40F formed with annular grooves 70 therein to render the piston 35F and 36F more flexible in their self-aligning in the housing sections 18F and 19F than if the annular grooves 70 were not provided as in the valve constructions 10, 10A, 10B, 10C, 10D and 10E of FIGS. 1–8.

In addition, the pistons 35F and 36F of the valve construction 10F are of different lengths and thereby have their free ends 39F disposed in offset relation relative to each other.

The pistons 35F and 36F carry the resilient sealing members 49F, 55F and 56F in such a manner thereon that the sealing member 49F for the piston 35F controls the valve seat means 31F to either fluidly interconnect together the ports 26F and 27F or to prevent fluid communication therebetween through the valve seat means 31F under the control of the compression spring 44F and the temperature responsive device 15F in the manner previously described. Similarly, the sealing members 55F and 56F of the piston 36F cooperate with the valve seat means 32F to either fluidly interconnect the ports 28F and 29F together through opening of the valve seat means 32F or to prevent fluid communication between the ports 28F and 29F by closing the valve seat means 32F in the manner previously described. Thus, it can be seen that the pistons 35F and 36F work independently of each other in the valve construction 10F.

The section 18F of the chamber 14F of the housing means 12F of the valve construction 10F of this invention has a wall member 71 disposed across the same and dividing the chamber section 18F into two parts 72 and 73, the wall member 71 carrying an umbrella type one-way flexible check valve means that is generally indicated by the reference numeral 74.

Figure 12:
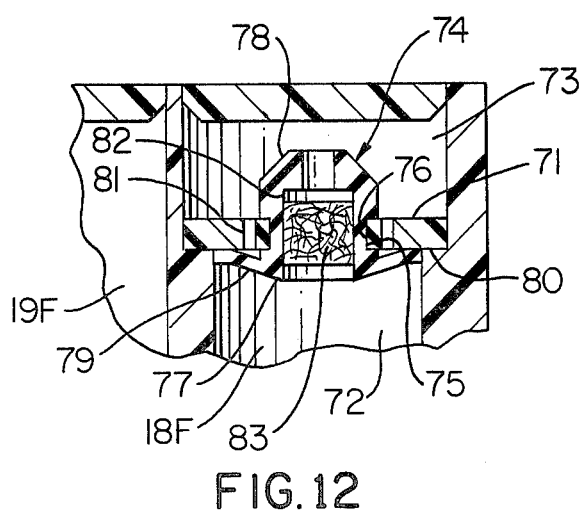
FIG. 12 is an enlarged fragmentary view of the one-way check valve means and restriction means of the valve construction of FIGS. 9 and 10.
Figure 14:
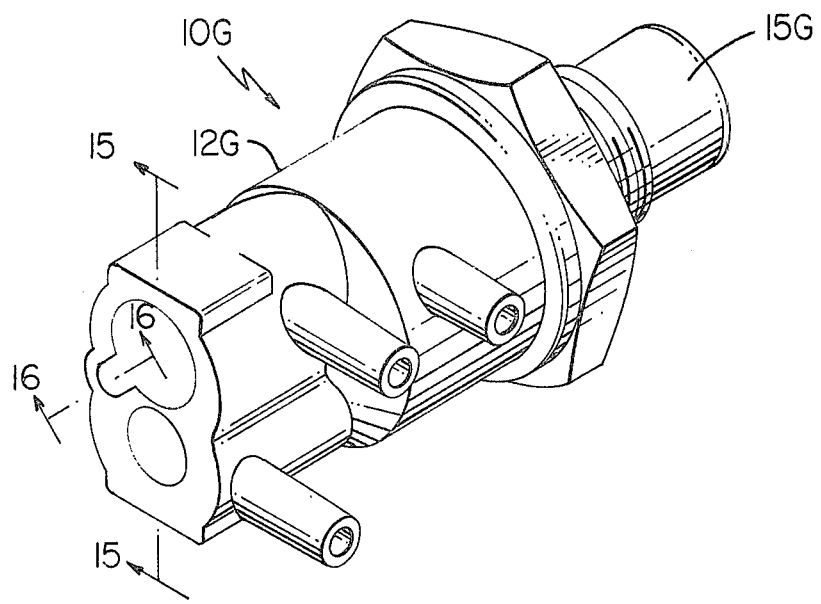
FIG. 14 is a perspective view illustrating another embodiment of the valve construction of this invention.

The one-way check valve means 74 has a central stem portion 75, as best illustrated in FIG. 12, passing through and being secured in an opening 76 formed centrally through the wall 71 so as to be carried thereby, the stem portion 75 having opposed ends 77 and 78. The end 77 of the check valve means 74 includes a disc-like annular flange member 79 that is adapted to normally bear against the side 80 of the wall 71 to seal completely around a plurality of openings 81 formed through the wall member 71 outboard of the central opening 76 thereof.

In this manner, should a vacuum or a reduced pressure be imposed in the part 72 of the chamber section 18F, the resulting pressure differential between the fluids in the parts 73 and 72 will cause the flange 79 to move away from the side 80 of the wall member 71 to fluidly interconnect the parts 73 and 72 together and permit fluid flow from the part 73 to the part 72. Conversely, should a fluid pressure exist in the part 72 greater than in the part 73, the resulting pressure differential acting across the flange 79 of the one-way check valve means 74 will cause the flange 79 to fully seal against the side 80 of the wall 71 and thereby prevent fluid communication between the parts 72 and 73 of the housing section 18F.

The wall member 71 is arranged in the housing means 12F in such a manner that the port 26F is disposed intermediate the valve seat means 31F and the wall member 71 for a purpose hereinafter described, the one-way check valve means 74 being disposed in aligned relation with the piston 35F but is spaced from the free end 39F thereof for a purpose hereinafter described.

The resilient stem 75 of the one-way check valve means 74 has a stepped opening 82 passing completely through the opposed ends 77 and 78 thereof and receives a porous restriction member 83 therein which restricts fluid flow through the opening 82 of the stem 85 of the one-way check valve means 74 in a controlled bleed manner as will be apparent hereinafter. Thus, the restriction means 63 always interconnects the parts 72 and 73 of the chamber 18F together but at a controlled bleed rate.

Figure 11:
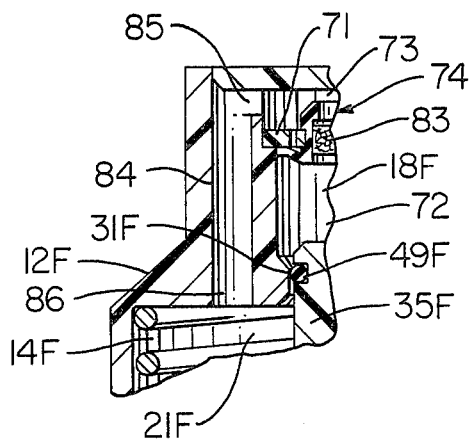
FIG. 11 is a fragmentary cross-sectional view taken on line 11—11 of FIG. 9.
Figure 13:
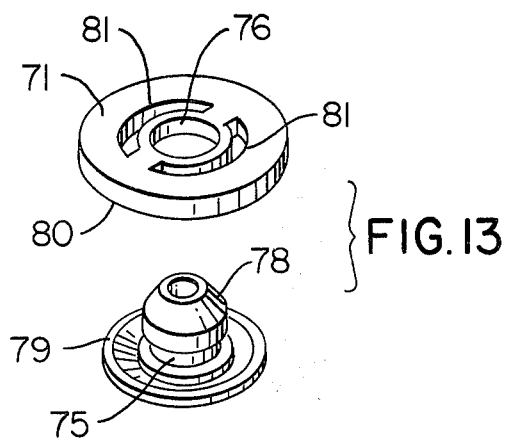
FIG. 13 is an exploded perspective view of the one-way check valve means and its wall means for the valve construction of FIG. 12.

As illustrated in FIGS. 10 and 11, an internal passage 84 is formed in the housing means 12F to have one end 85 thereof fluidly interconnected with the part 73 of the chamber section 18F while the other end 86 thereof fluidly interconnects with the main part or section 21F of the chamber 14F of the housing means 12F as illustrated in FIG. 11.

In this manner, the passage 84 in combination with the one-way check valve means 74 provides a by-pass passage means adapted to fluidly interconnect the ports 26F and 27F together independently of the valve seat means 31F as will be apparent hereinafter.

In addition, it can be seen that the by-pass passage 84 cooperates with the restriction means 83 to provide means for fluidly interconnecting the ports 26F and 27F together independently not only of the main valve seat means 31F, but also independently of the action of the one-way check valve means 74 as will be apparent hereinafter.

The operation of a valve construction 10F of this invention will now be described.

As previously stated, the temperature responsive device 15F in cooperation with the compression spring 44F will position the piston means 17F in the chamber means 14F in relation to the sensed temperature thereof.

Since the piston 37F of the valve construction 10F of this invention performs the function of either interconnecting the ports 28F and 29F together or maintaining the same separate from each other by controlling the opening and closing of the valve seat means 32F as illustrated in FIG. 10 in the manner previously described, a further discussion of the operation of the piston means 36F for the valve construction 10F is unnecessary.

However, it can be seen that when the temperature responsive device 15F is in the cold position illustrated in FIG. 10, the resilient member 49F of the piston 35F is maintaining the valve seat 31F in a closed condition so that the ports 26F and 27F canot fluidly communicate with each other through the valve seat means 31F.

Thus, if a vacuum source or a lower pressure source is interconnected to the port 26F, the one-way check valve 74 will permit a fluid flow from the port 27F through the by-pass passage 84 and one-way check valve means 74 to the port 26F even though the valve seat means 31F is closed by the piston 35F. Conversely, should a lower pressure or vacuum source be interconnected to the port 27F, the one-way check valve 74 will prevent a fluid flow from the port 26F to the port 27F through the check valve means 74 and the by-pass passage 84 as the flange 79 seals against the wall member 71 for the reason previously described.

However, even with the one-way check valve 74 preventing fluid flow from the higher pressure port 26F through the check valve means 74 to the lower pressure port 27F, the restriction means 83 will provide such a fluid flow therethrough at a controlled rate from the port 26F to the port 27F, the rate being determined by the particular porosity of the restriction means 83.

When the temperature responsive device 15F is sensing a temperature that has caused the same to move the piston means 17F upwardly in FIG. 10 so that the sealing member 49F of the piston 35F is moved out of the valve seat means 31F, the ports 26F and 27F are fluidly interconnected together through the open valve seat means 31F and the check valve means 74 and restriction means 83 no longer are effective for their particular function.

Therefore, it can be seen that the one-way check valve means 74 and the restriction means 83 of the valve construction 10F of this invention are adapted to fluidly interconnect together the ports 26F and 27F independently of the valve seat means 31F, the one-way check valve means 74 so interconnecting the ports 26F and 27F in only one direction whereas the restriction means fluidly interconnects the ports 26F and 27F in either direction of flow therebetween but at a controlled rate.

Another valve construction of this invention is generally indicated by the reference numeral 10G in FIGS. 14–18 and parts thereof similar to the valve constructions of this invention previously described are indicated by like reference numerals followed by the reference letter "G".

Figure 15:
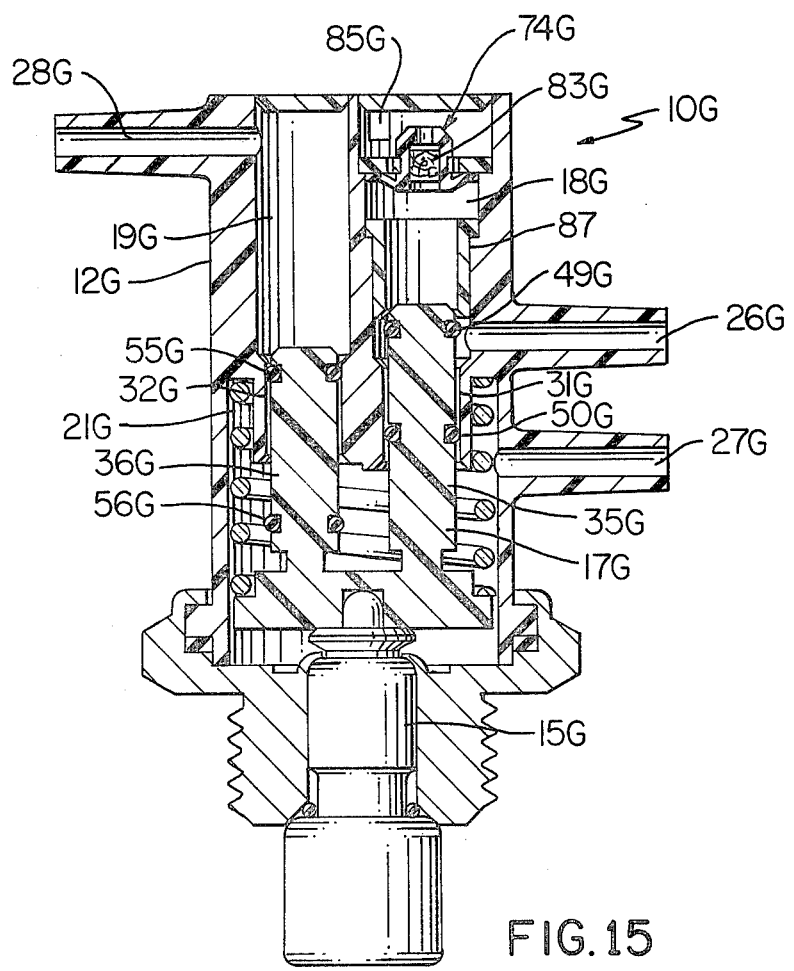
FIG. 15 is an enlarged cross-sectional view taken on line 15—15 of FIG. 14 with the two row of ports thereof being shown approximately 180° apart rather than parallel to each other as in FIG. 14.
Figure 16:
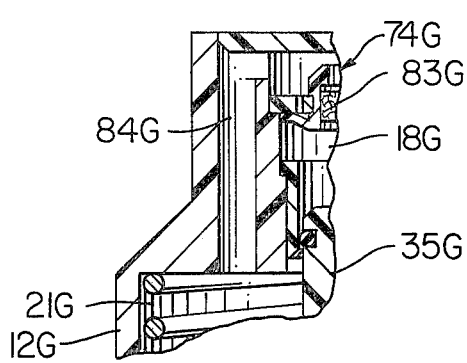
FIG. 16 is a fragmentary cross-sectional view taken on line 16—16 of FIG. 14.

As illustrated in FIG. 14–18, the valve construction 10G is substantially the same as the valve construction 10F previously described in connection with the pistons 35G and 36F thereof being of different lengths and the housing section 18G having the one-way check valve means 74G and restriction means 83G therein to control the by-pass passage 84G, FIG. 16, in a manner hereinafter described.

However, the housing means 12G of the valve construction 10G is so constructed and arranged that the same has a short valve seat means 32G in the housing section 19G and only a single port 28F interconnecting with the section 19G.

Figure 17:
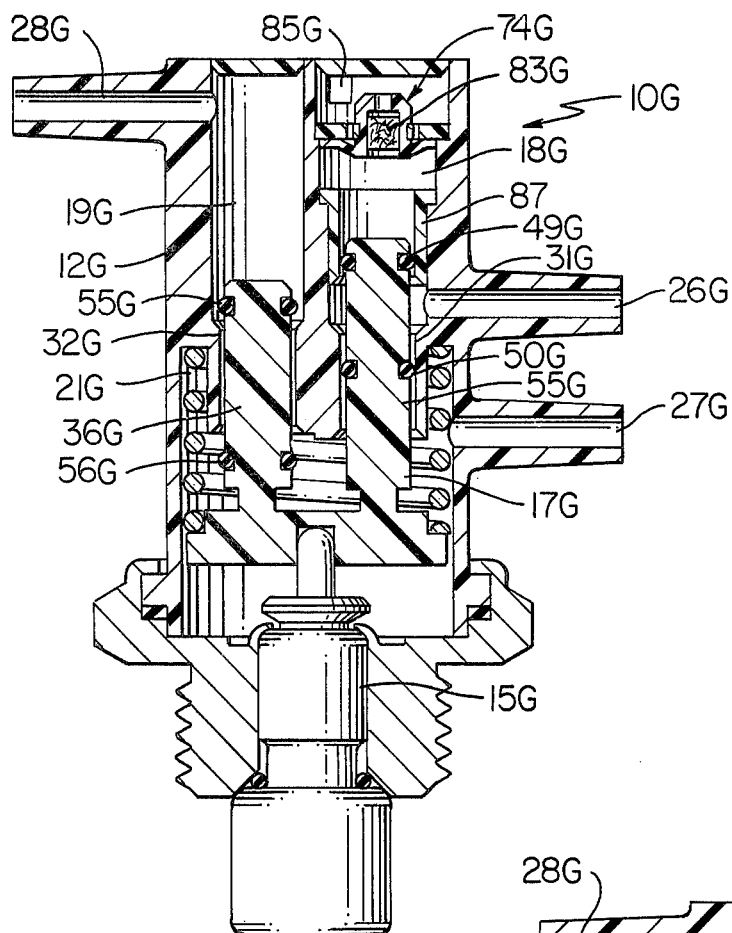
FIG. 17 is a view similar to FIG. 15 and illustrates the piston means of the valve construction in another operating position thereof.

The annular sealing members 55G and 56G on the piston 36G are so constructed and arranged that when the temperature responsive device 15G moves the piston means 17G from the position illustrated in FIG. 15 where the annular sealing member 55G is closing the valve seat 32G so that the port 28F is not interconnected to the main chamber part or section 21G to the position illustrated in FIG. 17, the valve seat means 32G is opened to fluidly interconnect the section 19G to the main section 21G as long as the other annular member 56G of the piston 36G is spaced from the valve seat means 32G. However, further expansion of the temperature responsive device 15G moves the piston means 17G to the position illustrated in FIG 18 where the annular sealing member 56G closes the valve seat means 32G to again disconnect the port 28F from the main section 21G for a purpose hereinafter described.

In addition, the housing section 18G for the piston 35G has an additional tubular valve seat member 87 disposed therein intermediate the port 26G and the one-way check valve means 74G, the valve seat means 87 being spaced from the main valve seat means 31G that is disposed intermediate the ports 26G and 27G.

Figure 18:
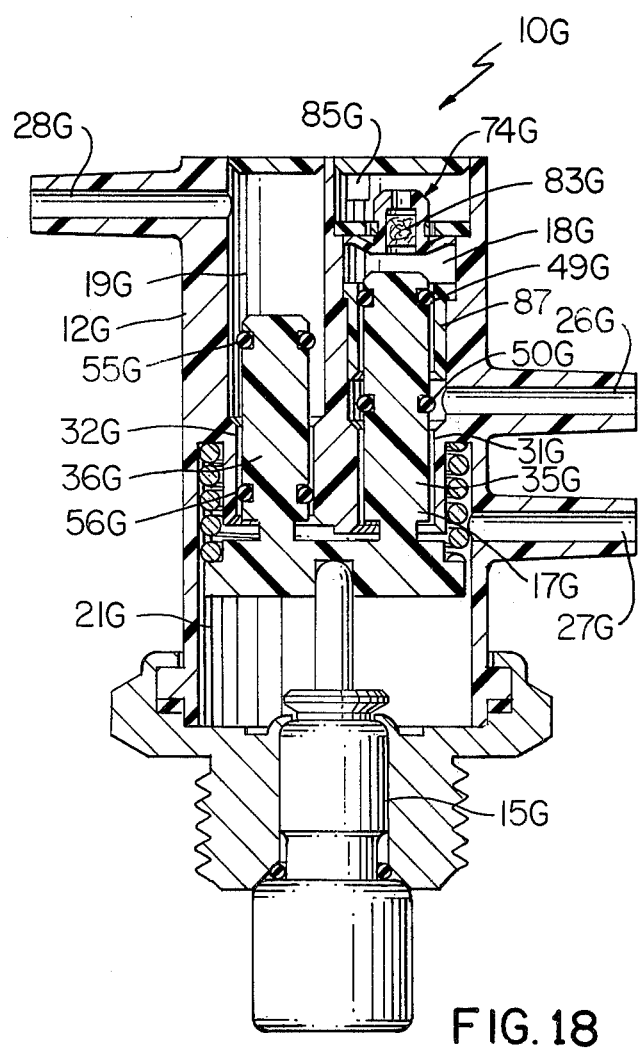
FIG. 18 is a view similar to FIG. 17 and illustrates the piston means of the valve construction in still another operating position thereof.

The piston member 35G has a pair of annular sealing members 49G and 50G carried thereon in such a manner that the annular sealing member 50G normally closes the valve seat means 31G when the temperature responsive device 15G is in the cold condition illustrated in FIG. 15 and will open the same when the piston means 17G has been moved to the position illustrated in FIG. 18.

The annular sealing member 49G on the piston 35G is arranged in such a manner that when the temperature responsive device 15G is disposed in the cold condition of FIG. 15, the valve seat means 87 is in an open condition so that the port 26G is interconnected by the valve seat 87 to the one-way check valve means 74G as well as to the restriction means 83G for a purpose hereinafter described. However, when the temperature responsive device 15G moves the piston means 17G to the intermediate position illustrated in FIG. 17 so that the valve seat means 32G for the section 19G is in an open condition, the annular sealing member 49G on the piston 35G closes the valve seat 87 to disconnect the port 26G from the one-way check valve means 74G and the restriction means 83G whereby the port 26G is completely sealed from the port 27C by the closed valve seat means 87 and 31G.

However, when the piston means 17G is moved by the device 15G to the position illustrated in FIG. 18, the valve seat 87 remains closed by the sealing member 49G while the valve seat means 31G is now opened by the annular sealing member 50G so that the ports 26G and 27G are fluidly interconnected together through the opened valve seat 31G, the valve seat 32G being closed by the sealing member 56G on the piston 36G at this time as previously described.

The valve construction 10G of this invention is adapted to operate in the manner now to be described.

Assuming that the port 28G of the valve construction 10G is interconnected to the ported vacuum of a carburator of an internal combustion engine for a transportation vehicle or the like, the port 26G is interconnected to the manifold vacuum thereof and the port 27G is interconnected to a pneumatically operated device on the distributor of such engine while the temperature responsive device 15G is sensitive to the temperature of the engine, it can be seen that when the engine is cold as illustrated in FIG. 15, the vacuum manifold port 26G is connected to the distributor port 27G through the opened valve seat 87, one-way check valve means 74G, by-pass passage 84G and main chamber section 21G.

However, with the engine in the cold condition of FIG. 15, should a loss of manifold vacuum occur at the port 26G, such when the vehicle is being accelerated, the vacuum previously connected to the distributor device by the port 27G is locked therein because the one-way check valve means 74G prevents a flow of pressure fluid from the port 26G through the one-way check valve 74G to the port 27G. However, the restriction means 83G is still adapted to interconnect the port 27G through the by-pass passage 84G to the port 27G but only at a controlled rate so that the vacuum at the port 27G and, thus, at the distributor device, bleeds down at a given rate rather than by having a complete dumping thereof as would be the case if the valve means 74G was not a one-way check valve means.

As the engine heats up, the double-break wax charge of a temperature responsive device 15G first moves the piston valve means 17G to the position illustrated in FIG. 17 which cuts out the check valve means 74G and the restrictor means 83G as the annular sealing member 49G of the piston 35G closes the valve seat 87. The ported vacuum from the carburator at the port 28F is now interconnected to the distributor port 27G because the piston valve member 36G has moved its annular sealing member 55G away from the valve seat 32G to open the same whereby the port 28F is now interconnected to the main section 21G and, thus, to the port 27G.

As the temperature of the engine reaches the second break point temperature of the device 15G, the temperature responsive device 15G now moves from the position illustrated in FIG. 17 to the position illustrated in FIG. 18 and thereby disconnects the ported vacuum from the carburator port 28F from the port 27G as the annular sealing member 56G of the piston 36G closes the valve seat means 32G. Simultaneously, the piston 35G now interconnects the manifold port 26G to the distributor port 27G as the piston 35G has the annular sealing member 50G thereof open the valve seat 31G, the valve seat 87 being continued to be closed by the annular sealing member 49G of the piston 35G so that the one-way check valve means 74G as well as the restrictor 83G are still out of the picture.

Therefore, it can be seen that the valve construction 10G of this invention utilizes both housing sections 18G and 19G during the operation of the temperature responsive device 15G in moving the piston means 17G from the position illustrated in FIG. 15 to the position illustrated in FIG. 18 as previously described.

However, it is to be understood that the valve construction 10G could be modified so that the piston 36G and chamber section 19G are eliminated in order to provide merely a check valve arrangement for the piston 35G in a manner not taught or suggested by the prior art.

Also, it is to be understood that while the previous description of the operation of the valve construction 10G had the same being utilized with an internal combustion engine in a certain manner, this invention is not to be limited to any particular use of the valve construction 10F as the same can be utilized for other purposes, as desired.

Therefore, it can be seen that this invention not only provides a valve construction having a piston means comprising a plurality of piston members disposed in spaced parallel relation and being secured together to move in unison in response to a condition sensed by a condition responsive device so that the overall length of the valve construction of this invention is relatively short when compared with conventional valve constructions that accomplish the same number of switching operations, but also this invention provides a method of making such a valve construction or the like.

While the forms and methods of this invention now preferred have been illustrated and described as required by the Patent Statute, it is to be understood that other forms and method steps can be utilized and still fall within the scope of the appended claims.

What is claimed is:

1. In a valve construction having a housing means provided with a chamber and port means leading to said chamber and having an axially movable piston means disposed in said chamber to interconnect certain of said port means together in relation to the axial position of said piston means that is caused by a condition reponsive device and a spring means operatively associated with said piston means, the improvement wherein said piston means comprises a plurality of pistons disposed in spaced substantially parallel relation and being secured together to be axially moved in unison in said chamber under the influence of said condition responsive device, said spring means comprising a single coiled compression spring telescopically receiving said pistons therein, said port means comprising first, second and third port means leading to said chamber, said piston means comprising first and second pistons, said chamber having first and second sections respectively receiving part of said first and second pistons therein, said first and second sections respectively having said first and second port means interconnecting therewith whereby each piston part controls the port means of its respective section independently of the other piston, said chamber having a third section thereof that is disposed in communication with said first and second sections and receiving the remaining parts of said pistons therein, said third port means interconnecting with said third section of said chamber in all positions of said pistons in said chamber, said housing means having first and second valve seat means respectively in said first and second sections and respectively intermediate said third port means and said first and second port means, said first and second pistons respectively controlling said first and second valve seat means.

2. A valve construction as set forth in claim 1 wherein each said valve seat means comprises an inwardly stepped cylindrical valve seat section of said housing means and disposed in its respective chamber section.

3. A valve construction as set forth in claim 1 wherein said piston means has a position in said chamber where said first and second pistons prevent fluid communication between said third port means and said first and second port means through said first and second valve seat means.

4. A valve construction as set forth in claim 2 wherein each said valve seat section has opposed end shoulders disposed in its respective chamber section.

5. A valve construction as set forth in claim 2 wherein each said piston has an outer peripheral cylindrical surface interrupted by an annular groove, resilient O-ring members respectively disposed in said annular grooves and extending outwardly from their respective cylindrical surfaces to be adapted to sealingly engage their respective cylindrical valve seat sections when disposed therein.

* * * * *